UNITED STATES PATENT OFFICE.

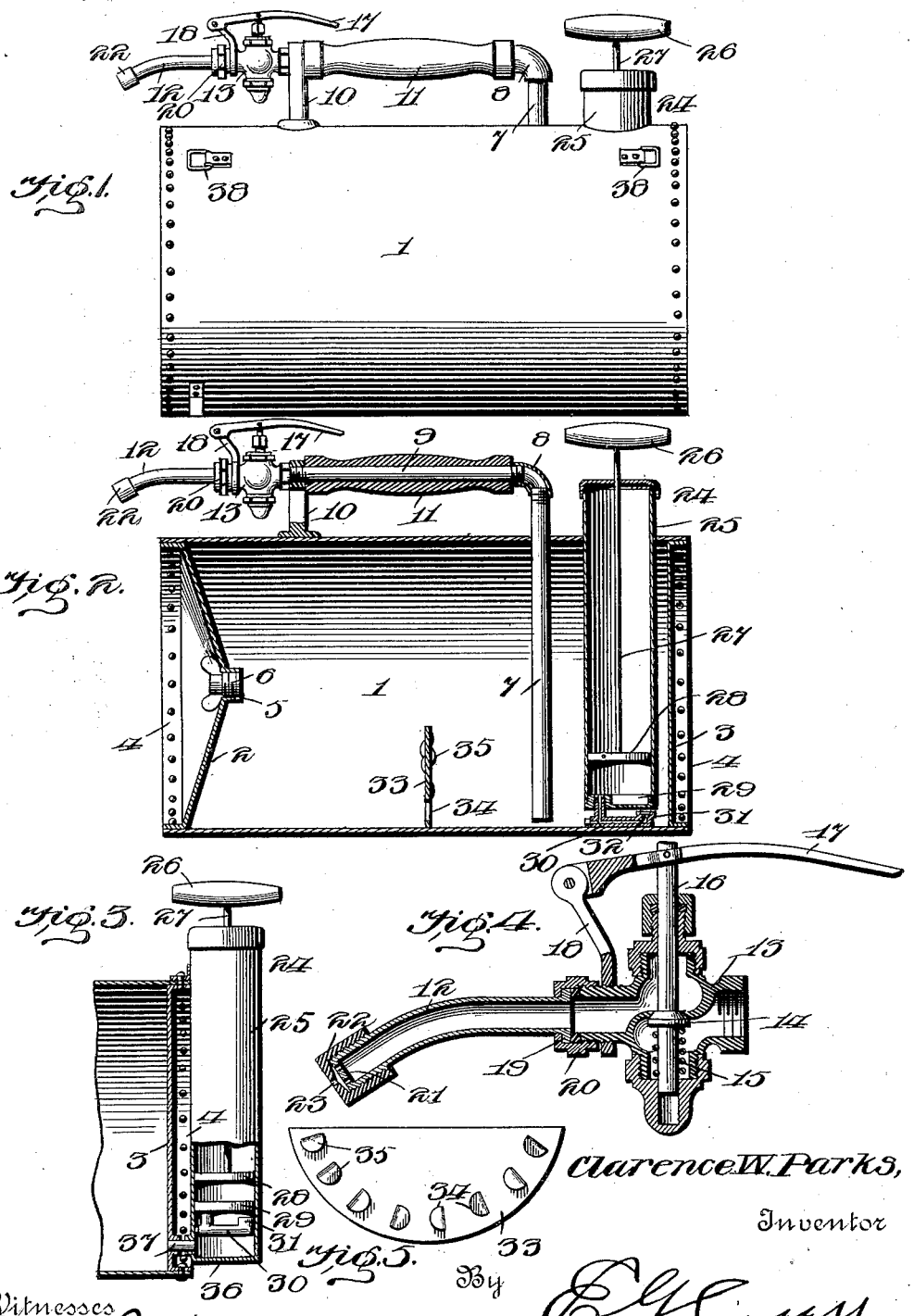

CLARENCE W. PARKS, OF LOWELL, MICHIGAN, ASSIGNOR OF ONE-HALF TO ALONZO O. FREEMAN, OF IONIA CITY, MICHIGAN.

SPRAYER.

SPECIFICATION forming part of Letters Patent No. 688,261, dated December 3, 1901.

Application filed November 10, 1900. Serial No. 36,111. (No model.)

*To all whom it may concern:*

Be it known that I, CLARENCE W. PARKS, a citizen of the United States, residing at Lowell, in the county of Kent and State of Michigan, have invented a new and useful Sprayer, of which the following is a specification.

My invention relates to a novel sprayer for distributing insecticides upon vegetation, and has for its object the production of a simple, durable, and efficient device of this character embodying a reservoir and a valve-controlled delivery-pipe constituting a handle by means of which the reservoir or vessel may be carried and terminating in a spray-nozzle designed to deliver the liquid insecticide in finely-comminuted form under the pressure of air obtained by means of an air-pump constituting a part of the device.

Other and subordinate objects of the invention will hereinafter appear as the necessity for their accomplishment is developed in the succeeding description, taken in connection with the accompanying drawings, in which I have illustrated a preferred embodiment of the sprayer.

In said drawings, Figure 1 is a side elevation of my sprayer complete. Fig. 2 is a central longitudinal section therethrough. Fig. 3 is a sectional elevation of a portion of the device, illustrating a modification of the structure, which consists in mounting the air-pump upon the exterior of the reservoir. Fig. 4 is a sectional view of the controlling-valve and spray-nozzle detached, and Fig. 5 is a detail view of the agitating plate or partition.

Referring to the numerals of reference employed to designate corresponding parts throughout the views, 1 indicates a receptacle or reservoir, preferably constructed of sheet metal and of cylindrical form. This reservoir is designed for the reception of a liquid insecticide under pressure and is therefore provided at its opposite ends with heads 2 and 3, having their outer edges bent outwardly to form bolt-flanges 4, bolted or riveted, as shown, to the inner face of the cylindrical wall of the receptacle. In order to facilitate the filling of the reservoir or tank, the head 2 is preferably made concave or of general funnel form and is pierced at its center by a filling-opening 5, closed by a screw-plug 6. Extended into the interior of the reservoir from the exterior thereof is a delivery-pipe 7, extending nearly to the wall of the chamber opposite its point of entrance therein and provided at its opposite end with an angle-fitting 8 for the attachment of a horizontal portion or branch 9 of said delivery-pipe, which branch is supported at one end by its connection with the pipe 7 and at its opposite end by a bracket 10, upstanding from the wall of the reservoir. The branch 9 of the delivery-pipe is thus positioned to constitute a handle, by means of which the receptacle may be carried from place to place, and may, if desired, be fitted with a hand-hold or grip 11, as shown in the drawings.

At the front end of the branch 9 it is provided with a spray-nozzle 12 through the medium of an intermediate controlling-valve casing 13, within which is located a controlling-valve 14, urged to its closed position by a spring 15, and having its stem 16 operatively connected with a valve-lever 17, pivoted upon a bracket 18, carried by the casing 13. The lever 17 is extended over the handle of the device in order that it may be depressed by the thumb of the hand gripping the handle when it is desired to open the controlling-valve for the purpose of permitting the insecticide to escape from the reservoir and to be discharged from the spray-nozzle. The nozzle 12 is of angular form and has a swivel connection with the controlling-valve casing in order that it may be readily turned for the purpose of discharging the spray in any desired direction without necessity for changing the position of the reservoir. This swivel connection is preferably effected by providing the nozzle with an annular flange 19 at its rear extremity retained within a coupling-sleeve 20, screwed upon the casing 13.

The outer end of the nozzle 12 is formed with a foraminous closure 21 and is covered further by a spray-cap 22, screwed upon the end of the nozzle and provided with a single jet-orifice 23. In order that the insecticide may be projected to a considerable distance from the nozzle and may be finely comminuted to form an effective spray or mist, I provide for the subjection of the liquid insecticide within the receptacle to a considerable pressure of air. The introduction and compression of the air are effected by means of an air-pump 24, the cylinder 25 of which may be and preferably is extended into the reservoir immediately behind and parallel with the delivery-pipe 7 for the purpose of locating the operating-handle 26 of the pump directly in the rear of the handle, by means of which the tank or receptacle is carried. The handle 26 is of course connected, by means of a piston-rod 27, to the piston 28, and the lower end of the cylinder is closed by a head 29, into which is screwed one end of an angular valve-tube 30, provided at its end opposite its connection with the head with a valve-nipple 31, within which is mounted a check-valve 32, disposed directly under and limited in its upward movement by the head 29. This peculiar construction of the lower or inner cylinder-head and the valve connection serves to locate the valve at sufficient distance above the bottom of the tank to remove it from obstruction from such sediment as may accumulate therein, and at the same time the valve-tube rests upon the bottom of the tank or receptacle and serves to aid in the retention of the pump therein.

For the purpose of providing simple and efficient means for agitating the liquid in order to secure the complete diffusion of the poison or insecticide I provide within the receptacle a segmental baffling or agitating plate or partition 33, extending across and conforming to the contour of the lower portion of the tank and provided with a series of openings defined by substantially semicircular slits 34. The tongues 35, of metal, formed by these curved slits in the partition, are alternately bent in opposite directions out of the plane of the partition. It will now be seen that if the reservoir, tank, or receptacle is given a quick movement occasionally the liquid will be caused to swirl against, over, and through the plate 33, which thereby serves to agitate the sediment and cause the latter to be diffused uniformly throughout the body of contained liquid. This diffusion will also be augmented in considerable measure by the liberation of the air at a point adjacent to the bottom of the tank, from whence it must rise through the body of the liquid to a point above the level thereof.

In Fig. 3 I have illustrated a modified form of my invention, which consists in mounting the pump upon the exterior of the receptacle, the head 29 in this adaptation being located some little distance above the closed end 36 of the pump-cylinder and the air being permitted to escape from the cylinder below the head through a short pipe-section 37, affording communication between the pump and the reservoir.

The operation of my device is as follows: The screw-cap 6 having been removed, the liquid insecticide is poured into the tank through the medium of the concave head 2 without the use of a funnel, and the plug having been replaced the contained liquid is subjected to considerable pressure by the manipulation of the air-pump 24. When the desired pressure has been attained, the operator by grasping the handle of the reservoir carries the sprayer along the row of vegetation to be sprayed and by turning the spray-nozzle 12 to any extent may direct the spray in any direction to facilitate the spraying of various kinds of vegetation, and when it is desired to project the spray the lever 17 is depressed by the thumb and the valve is held open until the release of the lever, when, as will be evident, the spring 15 immediately closes the valve to cut off the discharge of the insecticide. If desired, a shoulder-strap may be provided to aid in carrying the tank, and I therefore provide the latter with strap-loops 38 for facilitating its attachment thereto.

From the foregoing it will be observed that I have produced a simple, durable, and effective sprayer embodying a construction best calculated to effect the accomplishment of the several objects stated; but while the present embodiment of the invention appears at this time to be preferable I wish to reserve the right to effect such changes, modifications, and variations as may fall within the scope of the protection prayed.

What I claim is—

1. In a sprayer, the combination with a reservoir designed to contain a liquid, and means for compressing air therein, of a delivery-pipe communicating with the interior of the receptacle and disposed upon the exterior thereof to constitute a handle, a nozzle extending from said handle, and means disposed opposite the handle for controlling the discharge of the liquid.

2. In a sprayer, the combination with a receptacle provided with a handle supported at its opposite ends, of a valve-controlled spray-nozzle extending from the handle.

3. In a sprayer, the combination with a receptacle provided with a handle, of a valve-controlled nozzle extending from one end of the handle, and valve-operating mechanism located opposite the handle, whereby the device may be carried and the valve controlled with one hand.

4. In a sprayer, the combination with a receptacle, of a delivery-pipe communicating with the interior of the receptacle and having a branch constituting a handle to facilitate the transportation of the device, a valve-controlled spray-nozzle extending from the extremity of said branch, and valve-operating mechanism disposed opposite the handle.

5. In a sprayer, the combination with a receptacle provided with an air-pump communicating with the interior thereof, of a delivery-pipe extending into the receptacle and provided with an angularly-related branch constituting a handle for the receptacle, a controlling-valve carried by the extremity of the branch and having a valve-lever extended over the handle, and a spray-nozzle extending beyond the valve.

6. In a sprayer, the combination with a receptacle, of a delivery-pipe piercing the wall thereof, a bracket outstanding from the receptacle, a branch pipe supported at one end by the bracket and to its opposite end by the delivery-pipe to constitute a handle for the sprayer, a valve-controlled nozzle extended beyond one end of the handle and in communication with the delivery-pipe, and means for compressing air within the receptacle.

7. In a sprayer, the combination with a receptacle provided with a delivery-pipe and spray-nozzle, of a fixed agitating-plate vertically disposed and extending across the receptacle at its bottom only and designed to effect the agitation of the contents thereof as the receptacle is given a sudden movement whereby chemical or other sediment is prevented from accumulating at the bottom of the receptacle.

8. In a sprayer, the combination with a receptacle provided with a delivery-pipe and nozzle, of a segmental agitating-plate permanently disposed across the bottom portion of the receptacle and provided with a series of openings, and tongues opposed to said openings and bent alternately in opposite directions from the plane of the plate.

In testimony that I claim the foregoing as my own I have hereto affixed my signature in the presence of two witnesses.

CLARENCE W. PARKS.

Witnesses:
C. G. PERRY,
M. N. HINE.